C. B. Knapp,
Dovetailing Machine,

Sheet 1-2 Sheets.

N° 63,532. Patented Apr. 2, 1867.

Witnesses:
Inventor:

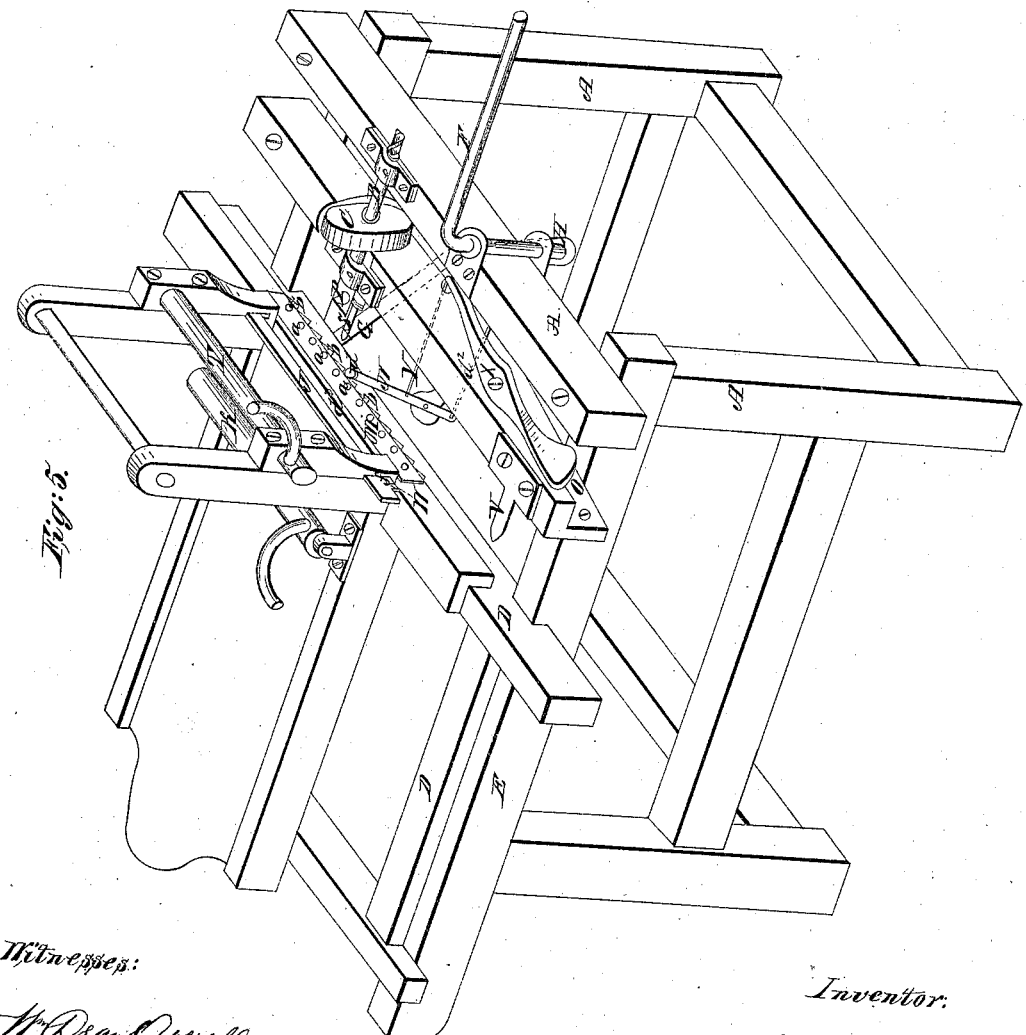

United States Patent Office.

CHARLES B. KNAPP, OF WATERLOO, WISCONSIN.

Letters Patent No. 63,532, dated April 2, 1867.

IMPROVEMENT IN BORING MACHINES.

*The Schedule referred to in these Letters Patent and making part of the same.*

TO ALL WHOM IT MAY CONCERN:

Be it known that I, CHARLES B. KNAPP, of Waterloo, in the county of Jefferson, and State of Wisconsin, have invented a new and improved Machine for Jointing Wood, and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

The joint produced by my improved machine is of that class of joints known by the general name of a "tenon and mortise joint," the particular form of the tenon in this instance being in cross-section, round or circular, with the mortise or hole of a corresponding shape and size thereto, so that when placed one within the other they will form a close and tight joint. The particular feature of the machine embraced in this invention for the jointing of wood with a joint of the form above stated consists in the combination of an auger or boring tool suitable for forming a tenon or boring a mortise, as the case may be, arranged to turn or revolve in a fixed plane, with a carriage or bed carrying the wood which is to be operated upon so arranged as to have a combined regular intermittent rectilinear movement across the plane of revolution of the boring-tool or auger and a movement toward and away from the same, whereby the material or wood is not only carried to the auger to be operated upon, but is so fed as to enable a series of tenon-pins or mortises, as the case may be, to be produced upon or in the wood at regular and equal distances apart.

Figure 1:
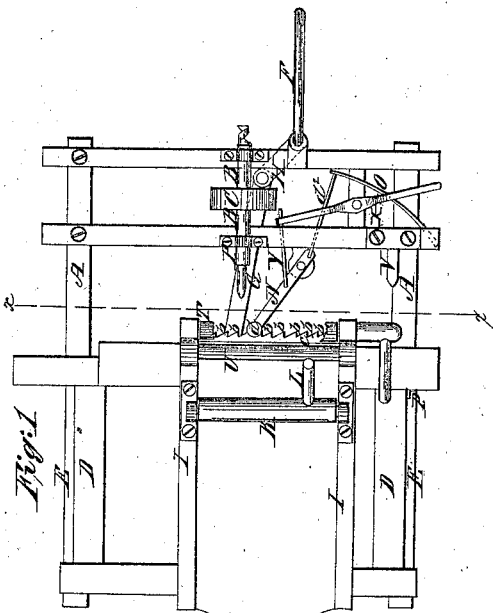

In addition to the above, which, as has been stated, is the principal feature, or, in other words, the principle of the present invention, I have made other improvements in the detail, construction, and arrangement of the machine, which, for its successful operation and use, are quite important, as will be obvious from the following description of the machine, reference being had to the accompanying plates of drawings, in plate 1 of which Figure 1 is a plan or top view of my improved machine for the jointing of wood.

Figure 2:
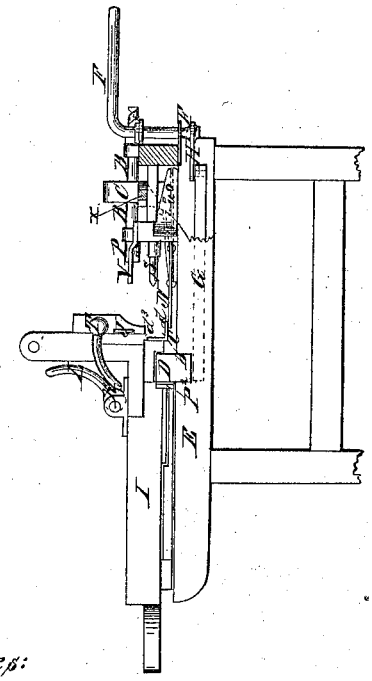

Figure 2, a side elevation of the same.

Figure 3:
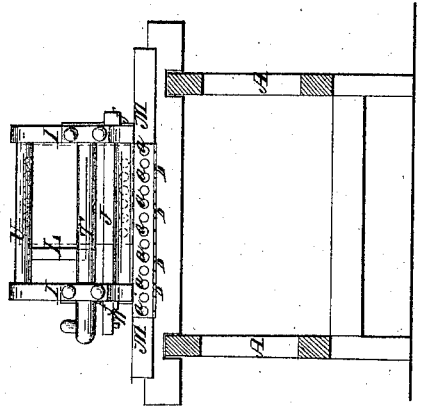
Figure 4:
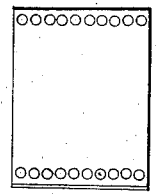

Figure 3, a transverse vertical section taken in the plane of the line $x\ x$, fig. 1; and Figure 4, a detail view of the jointing produced by the machine.

Figure 5, in plate 2, is an isometrical perspective view of the machine.

A A, in the drawings, represent the framework of the machine, which may be of any suitable construction to receive the working parts of the same, to be hereinafter explained. B the shaft or mandrel for carrying the auger or boring tool of the machine, which shaft or mandrel is arranged to turn or revolve in suitable bearings upon the upper side of the framework A by connecting it, through its pulley, C, with any suitable driving power. D, a frame arranged upon the upper side of the framework A, so as to slide upon the side bars or rails E of the same toward and away from the revolving shaft or mandrel carrying the boring or cutting tool used, this frame moving in a horizontal plane and being operated by and through a lever-arm, F, arranged to turn upon the framework A, which lever, through a rod, G, hung at one end to its crank-arm H, is connected with the said frame upon its under side. I, a carriage arranged upon the frame D so as to slide in a direction across its width, or, in other words, at a right angle to the plane of its movement, on which carriage the board or wood which is to be tenoned or mortised, as may be desired, is placed with its end upon which the machine is to work toward and against the guide-bar J, extending across the width of the carriage at its end facing the cutter or boring tool, the board being firmly held and secured upon the said carriage I by bringing the cam or eccentric-roller K through its lever-handle L down and upon the same. In the front bar, M, of the carriage I, a series of holes, $a$, are made at equal and regular distances apart, corresponding in position to which holes a series of ratchet teeth, $b$, are made along the edge of the flange $c$, projecting horizontally from the said bar M. N, a pawl hung to the framework A so as to swing in a horizontal plane. This pawl projects or extends toward the ratchet flange $c$, with the teeth of which the headed stud or pin $d$ of its outer end engages as the said carriage is carried forward by the forward movement of the frame D, on which it is placed, produced by swinging the lever-arm F in the proper direction therefor, the pawl at its other end being connected through a wire, $d^2$, with a bent spring, O, secured to the framework A.

The operation of the machine, so far as above explained, will be now described. If the board is to be tenoned, or, in other words, provided with one or more tenon-pins, according to its width, or as may be desired, a cutting tool, such as is shown at P, is used upon the mandrel, when, placing and securing the board upon the carriage with its end against the guide-bar J and moving the carriage back upon the frame until it comes to a stop against the rest or pin P² of the said frame, the cutting tool is then set in motion by and through its pulley G in any suitable manner, when, swinging the lever-arm F either to the right or left, as the case may be, the frame is thereby drawn toward the cutting tool, bringing the ratchet flange e against the headed stud of the spring-pawl N, which, interlocking with one of such ratchet teeth, operates to slide the carriage I along upon the frame, as the forward movement of such frame is continued, when, as said pawl comes to a position parallel with, or nearly so, the front bar M of the carriage, the cutting tool commences to act upon the board, cutting it away at that point in the form of a tenon, corresponding in shape to the internal diameter of the cutting tool to the depth or extent desired. The lever-arm is then swung in the reverse or opposite direction, throwing the frame and the board-carriage back until the ratchet teeth of the carriage are free of the pawl, when, again swinging the said lever-arm in the proper direction to draw the frame forward, the ratchet teeth are again acted upon by the pawl sliding the carriage forward so that it will present the board which it carries to the action of the cutting tool at another point of the same, and so on, the position of the board at each and every forward movement of the frame and carriage being changed so as to present a different point of the same to the cutting tool, which several points will be at regular and equal distances apart, thereby forming a series of tenon-pins across the end of the board. In order to hold the carriage on which the board to be operated upon is placed steady while the cutting tool is working, I have fastened to the framework A a pin or stud, S, so as to project toward the carriage, which pin at each forward movement of the said carriage enters one of the holes a made in the same, according to the relative position of the said holes and the said pin, at or about the time the cutting tool commences to work, whereby the carriage is held steady, as is obvious without any further explanation. When mortises or holes are to be made in a board to receive tenons of corresponding shape the cutting tool is of course changed, and in lieu of laying the board upon the carriage it is secured in a vertical position at the front end of the same by and between the eccentric-roller T on one side and the stationary roller U at its upper end and the shoulder d at its lower end on the other side, as plainly shown in red lines in fig. 2 of the drawings, it being deemed best to back up such board where the cutting tool operates against it by a board placed and secured upon the carriage bed with its end against the rear side of the vertical board so as to prevent the board being mortised or bored splitting away if such mortises are to extend entirely through the thickness of the board.

It is not necessary for me to describe the operation of the machine when used for mortising, as it is substantially similar in every respect to that explained for tenoning, except in the manner of securing the board in position, which has been hereinabove particularly stated. In case the board to be tenoned is thinner than the width of the space embraced between the top of the carriage and the lower edge of the guide-rail, the guide-rail is so formed as to produce a rest for the board at its two corners, if the width of the board is equal to that of the carriage bed, by simply sliding such bar or rail in the proper direction to throw the wider portions f of such bar across the carriage bed, when, as the carriage through its frame moves forward, the projecting arm V fixed to the framework A interlocks with the notch W in the said rail, and so moves or slides it as to relieve it from the board in case it should cover any portion of the same upon which the cutting tool is to work, the sliding movement of the guide-rail being limited by pins, h, secured in it. In order to relieve the spring-pawl N from the ratchet-flange of the carriage when it is to be moved back to its original position, I have connected with such pawl through a wire a thumb-lever or arm, X, hung to the framework, by swinging which in the proper direction the pawl can be brought to a position free of the said ratchet-flange, so that the carriage can be thus slid with perfect ease and freedom across the frame on which it is placed.

The jointing formed by the machine hereinabove described may be used for various purposes, such as for the drawers of bureaus, desks, and other articles of furniture; for the manufacture of boxes of all classes, and, in fact, for the jointing of any parts together where it may be adapted, the machine enabling the jointing to be produced in such a systematic, regular, and even manner as to greatly decrease the expense now attendant upon the ordinary dove-tailing, so called.

Having thus described my invention, what I claim as new, and desire to secure by Letters Patent, is—

1. The pawl N, hung to the framework A, in combination with the ratchet teeth of the carriage I, and operating substantially as described for the purpose specified.

2. The guide-bar or rail J, arranged to slide at the front end of the carriage, and operating, in combination with the arm Y of the framework A, substantially as and for the purpose specified.

CHAS. B. KNAPP.

Witnesses:
S. M. CONE,
A. J. MORHAM.